(12) United States Patent
Imai

(10) Patent No.: US 7,256,551 B2
(45) Date of Patent: Aug. 14, 2007

(54) IMAGE DISPLAYING METHOD AND DEVICE AND IMAGE DISPLAYING CONTROL METHOD AND APPARATUS

(75) Inventor: Shinji Imai, Kanagawa-ken (JP)

(73) Assignee: Fujifilm Corporation, Tokyo (JP)

( * ) Notice: Subject to any disclaimer, the term of this patent is extended or adjusted under 35 U.S.C. 154(b) by 89 days.

(21) Appl. No.: 11/019,442

(22) Filed: Dec. 23, 2004

(65) Prior Publication Data

US 2005/0140834 A1 Jun. 30, 2005

(30) Foreign Application Priority Data

Dec. 26, 2003 (JP) ............... 2003-433467

(51) Int. Cl.
*G09G 3/10* (2006.01)

(52) U.S. Cl. ............... 315/169.1; 315/169.3; 359/242

(58) Field of Classification Search ............. 315/169.1, 315/169.3, 169.4; 359/242, 244, 254, 255, 359/298, 299

See application file for complete search history.

(56) References Cited

U.S. PATENT DOCUMENTS 6,438,282 B1* 8/2002 Takeda et al. ............... 385/16
6,747,786 B2* 6/2004 Murakami et al. .......... 359/291
7,016,100 B2* 3/2006 Kurosawa ................... 359/295
2004/0145696 A1* 7/2004 Oue et al. ................... 349/167

OTHER PUBLICATIONS

"Color Liquid Crystal Display", Hiroo Hori and Koji Suzuki, Kyoritsu Shuppan, pp. 73-140, Jun. 2001.

* cited by examiner

*Primary Examiner*—Shih-Chao Chen
*Assistant Examiner*—Minh Dieu A
(74) *Attorney, Agent, or Firm*—Sughrue Mion, PLLC

(57) ABSTRACT

A first electrode layer capable of transmitting visible light, a displaying layer, whose optical characteristics alter in accordance with an electric field, an optical switching layer capable of exhibiting electrical conductivity when being exposed to an electromagnetic wave, and a second electrode layer, which is provided with linear electrodes arrayed in parallel and capable of transmitting the electromagnetic wave, are overlaid in this order. A voltage is applied to each of the linear electrodes and in accordance with image information. Scanning with the electromagnetic wave is performed in two-dimensional directions and from the side of the second electrode layer, the optical characteristics of the displaying layer altering in accordance with an electric field formed between the first electrode layer and the optical switching layer, the image information being thereby displayed.

27 Claims, 3 Drawing Sheets

IMAGE DISPLAYING METHOD AND DEVICE AND IMAGE DISPLAYING CONTROL METHOD AND APPARATUS

BACKGROUND OF THE INVENTION

1. Field of the Invention

This invention relates to an image displaying method and device, wherein image information is displayed in accordance with an alteration in optical characteristics, which alteration is caused to occur by voltage application performed in accordance with the image information. This invention particularly relates to an improvement in a technique for the voltage application. This invention also relates to an image displaying control method and apparatus.

2. Description of the Related Art

As image displaying devices referred to as electronic paper, image displaying devices utilizing various displaying techniques have heretofore been proposed.

As the displaying techniques for the image displaying devices, for example, there have been proposed the displaying techniques, wherein image information is displayed in accordance with an alteration in optical characteristics, which alteration is caused to occur by voltage application performed in accordance with the image information. As the image displaying devices utilizing the displaying techniques described above, for example, there have been proposed micro-capsule types of electro-migration display devices provided with a dispersion layer, in which micro-capsules containing positively charged white particles and negatively charged black particles have been dispersed. With the micro-capsule types of electro-migration display devices, the white particles and the black particles are caused to migrate within each of the micro-capsules by voltage application performed in accordance with image information, and the image information is thereby displayed. As the image displaying devices utilizing the displaying techniques described above, there have also been proposed polymer network liquid crystal display devices provided with a liquid crystal layer, which has been prepared with a process, wherein a liquid crystal and an acrylic monomer are encapsulated within a cell, and wherein UV light is irradiated to the cell in order to form a polymer network within the liquid crystal. With the polymer network liquid crystal display devices, orientations of major axis directions of liquid crystal molecules are altered in accordance with voltage application, and image information is thereby displayed.

Examples of the techniques for applying the voltage to the dispersion layer or the liquid crystal layer in the image displaying devices described above include a passive technique for applying the voltage by use of a simple matrix electrodes and an active actuation technique for applying the voltage by use of thin-film transistors (TFT's). (The passive technique and the active actuation technique are described in, for example, "Color Liquid Crystal Display" Hiroo Hori and Koji Suzuki, Kyoritsu Shuppan, pp. 73-140, June 2001.)

However, with the passive technique utilizing the simple matrix electrodes described above, the problems are encountered in that, in cases where the number of pixels constituting the displayed image becomes large, contrast becomes low due to cross talk. Therefore, with the passive technique utilizing the simple matrix electrodes described above, it is not always possible to display image information of a large area and a high definition, such as the image information of electronic newspapers and electronic maps.

Also, with the active actuation technique utilizing the TFT's described above, since the actuation voltage is limited to at most approximately ±15V, it is not always possible to perform a quick alteration in optical characteristics of the dispersion layer or the liquid crystal layer with the low voltage described above. Further, the active actuation technique utilizing the TFT's described above has the problems in that the cost of the TFT boards is not capable of being kept low.

SUMMARY OF THE INVENTION

The primary object of the present invention is to provide an image displaying method, wherein image information is displayed in accordance with an alteration in optical characteristics, which alteration is caused to occur by voltage application performed in accordance with the image information, wherein image information of a large area and a high definition is capable of being displayed quickly, and wherein the cost is capable of being kept low.

Another object of the present invention is to provide an image displaying device for carrying out the image displaying method.

A further object of the present invention is to provide an image displaying control method, wherein an image displaying operation is controlled such that image information is displayed in accordance with an alteration in optical characteristics, which alteration is caused to occur by voltage application performed in accordance with the image information, wherein image information of a large area and a high definition is capable of being displayed quickly, and wherein the cost is capable of being kept low.

A still further object of the present invention is to provide an image displaying control apparatus for carrying out the image displaying control method.

The present invention provides an image displaying method, comprising the steps of:

i) overlaying:
  a) a first electrode layer, which is capable of transmitting visible light,
  b) a displaying layer, whose optical characteristics alter in accordance with an electric field,
  c) an optical switching layer, which is capable of exhibiting electrical conductivity when being exposed to an electromagnetic wave, and
  d) a second electrode layer, which is provided with a plurality of linear electrodes arrayed in parallel with one another, the linear electrodes being capable of transmitting the electromagnetic wave, in this order, ii) applying a voltage to each of the linear electrodes and in accordance with image information, and iii) performing scanning with the electromagnetic wave in two-dimensional directions and from the side of the second electrode layer, an electric field being formed between the first electrode layer and the optical switching layer by electric charges, which are caused to occur in the optical switching layer by the scanning with the electromagnetic wave, the optical characteristics of the displaying layer altering in accordance with the electric field, whereby the image information is displayed.

The present invention also provides an image displaying device, comprising:

i) a first electrode layer, which is capable of transmitting visible light, ii) a displaying layer, whose optical characteristics alter in accordance with an electric field, iii) an optical switching layer, which is capable of exhibiting electrical conductivity when being exposed to an electromagnetic wave, and iv) a second electrode layer, which is provided with a plurality of linear electrodes arrayed in parallel with one another, the linear electrodes being capable of transmitting the electromagnetic wave, the first electrode layer, the displaying layer, the optical switching layer, and the second electrode layer being overlaid in this order, wherein the image displaying device is operated such that:

a voltage in accordance with image information is applied to each of the linear electrodes, and scanning with the electromagnetic wave is performed in two-dimensional directions and from the side of the second electrode layer, an electric field being formed between the first electrode layer and the optical switching layer by electric charges, which are caused to occur in the optical switching layer by the scanning with the electromagnetic wave, the optical characteristics of the displaying layer altering in accordance with the electric field, whereby the image information is displayed.

The image displaying method and device in accordance with the present invention may be modified such that each of electrical insulators is located between adjacent linear electrodes.

Also, the image displaying method and device in accordance with the present invention may be modified such that the electrical insulators have characteristics of blocking the electromagnetic wave.

Further, the image displaying method and device in accordance with the present invention may be modified such that each of linear electromagnetic wave non-transmissive electrodes, which have characteristics of blocking the electromagnetic wave, is located between adjacent linear electrodes, the linear electromagnetic wave non-transmissive electrodes being located in parallel.

Furthermore, the image displaying method and device in accordance with the present invention maybe modified such that the displaying layer contains a plurality of micro-capsules dispersed therein, each of the micro-capsules containing two kinds of particles having different color tones and different polarities.

Also, the image displaying method and device in accordance with the present invention may be modified such that the displaying layer is constituted of a liquid crystal.

The term "alteration in optical characteristics" as used herein means that the optical characteristics alters such that the alteration is capable of being perceived visually.

In the image displaying method and device in accordance with the present invention, the scanning with the electromagnetic wave is performed in two-dimensional directions and from the side of the second electrode layer. Specifically, for example, the scanning with a line-like light may be performed along the length direction of each of the linear electrodes of the second electrode layer. Alternatively, the scanning with a spot-like light may be performed along the array direction of the linear electrodes of the second electrode layer, along which direction the linear electrodes stand side by side with one another, and along the length direction of each of the linear electrodes of the second electrode layer.

The present invention further provides an image displaying control method, wherein an image displaying operation is controlled such that an electric field in accordance with image information is formed across an image displaying medium, whose optical characteristics alter in accordance with an electric field, and the image information is thus displayed, the method comprising the steps of:

i) locating optical switching means, which is capable of exhibiting electrical conductivity when being exposed to an electromagnetic wave, and which acts to form the electric field across the image displaying medium, ii) arraying a plurality of linear electrodes in parallel with one another and in association with the optical switching means, the linear electrodes being capable of transmitting the electromagnetic wave, iii) applying a voltage in accordance with the image information from each of the linear electrodes to the optical switching means, and iv) irradiating the electromagnetic wave to the optical switching means.

The present invention still further provides an image displaying control apparatus, wherein an image displaying operation is controlled such that an electric field in accordance with image information is formed across an image displaying medium, whose optical characteristics alter in accordance with an electric field, and the image information is thus displayed, the apparatus comprising:

i) optical switching means, which is capable of exhibiting electrical conductivity when being exposed to an electromagnetic wave, and which acts to form the electric field across the image displaying medium, ii) electromagnetic wave irradiating means for irradiating the electromagnetic wave to the optical switching means, and iii) voltage applying means, which is provided with a plurality of linear electrodes arrayed in parallel with one another, the linear electrodes being capable of transmitting the electromagnetic wave, the voltage applying means operating such that a voltage in accordance with the image information is applied from each of the linear electrodes to the optical switching means.

With the image displaying method and device in accordance with the present invention, the first electrode layer, which is capable of transmitting visible light, the displaying layer, whose optical characteristics alter in accordance with an electric field, the optical switching layer, which is capable of exhibiting electrical conductivity when being exposed to an electromagnetic wave, and the second electrode layer provided with the plurality of the linear electrodes, which are arrayed in parallel with one another and are capable of transmitting the electromagnetic wave, are overlaid in this order. Also, with the application of the voltage to each of the linear electrodes and the scanning with the electromagnetic wave, the electric field is formed between the first electrode layer and the optical switching layer. The optical characteristics of the displaying layer are caused by the electric field to alter, and the image information is thus displayed. Therefore, with the image displaying method and device in accordance with the present invention, the advantages over the passive technique for applying the voltage by use of the simple matrix electrodes and thereby displaying the image information are capable of being obtained in that cross talk with respect to the length direction of each of the linear electrodes is capable of being suppressed, and in that the image information of a large area and a high definition is capable of being displayed with good image quality. Also, with the image displaying method and device in accordance with the present invention, the advantages over the active actuation technique utilizing the TFT's are capable of being obtained in that a high voltage is capable of being applied to each of the linear electrodes, and therefore the response speed of the displaying layer is capable of being kept high. Further, the cost is capable of being kept low.

With the image displaying method and device in accordance with the present invention, wherein each of the electrical insulators is located between adjacent linear electrodes, cross talk between the linear electrodes is capable of being suppressed. Therefore, the image quality of the displayed image is capable of being enhanced even further.

With the image displaying method and device in accordance with the present invention, wherein the electrical insulators have the characteristics of blocking the electromagnetic wave, discharging of the optical switching layer due to the irradiation of the electromagnetic wave to the areas among the linear electrodes is capable of being suppressed. Therefore, cross talk among the linear electrodes is capable of being suppressed even further.

Further, the image displaying method and device in accordance with the present invention may be modified such that each of the linear electromagnetic wave non-transmissive electrodes, which have the characteristics of blocking the electromagnetic wave, is located between adjacent linear electrodes, the linear electromagnetic wave non-transmissive electrodes being located in parallel. In such cases, the discharging of the optical switching layer due to the irradiation of the electromagnetic wave to the areas among the linear electrodes is capable of being suppressed. Also, since the areas among the linear electrodes are capable of being grounded with the electromagnetic wave non-transmissive electrodes, cross talk among the linear electrodes is capable of being suppressed even further.

Furthermore, the image displaying method and device in accordance with the present invention may be modified such that the displaying layer contains the plurality of the micro-capsules dispersed therein, each of the micro-capsules containing the two kinds of the particles having different color tones and different polarities. Alternatively, the image displaying method and device in accordance with the present invention may be modified such that the displaying layer is constituted of the liquid crystal. With each of the modifications described above, the image displaying device in accordance with the present invention is capable of being constituted comparatively easily and at a low cost.

With the image displaying control method and apparatus in accordance with the present invention, the voltage in accordance with the image information is applied from each of the linear electrodes to the optical switching means, and the electromagnetic wave is irradiated to the optical switching means. The electric field in accordance with the image information is thus formed by the optical switching layer and across the image displaying medium, and the image information is thereby displayed. Therefore, with the image displaying control method and apparatus in accordance with the present invention, the advantages over the passive technique for applying the voltage by use of the simple matrix electrodes and thereby displaying the image information are capable of being obtained in that cross talk with respect to the length direction of each of the linear electrodes is capable of being suppressed, and in that the image information of a large area and a high definition is capable of being displayed with good image quality. Also, with the image displaying control method and apparatus in accordance with the present invention, the advantages over the active actuation technique utilizing the TFT's are capable of being obtained in that a high voltage is capable of being applied to each of the linear electrodes, and therefore the response speed of the displaying layer is capable of being kept high.

DESCRIPTION OF THE PREFERRED EMBODIMENTS

The present invention will hereinbelow be described in further detail with reference to the accompanying drawings.

Figure 1:
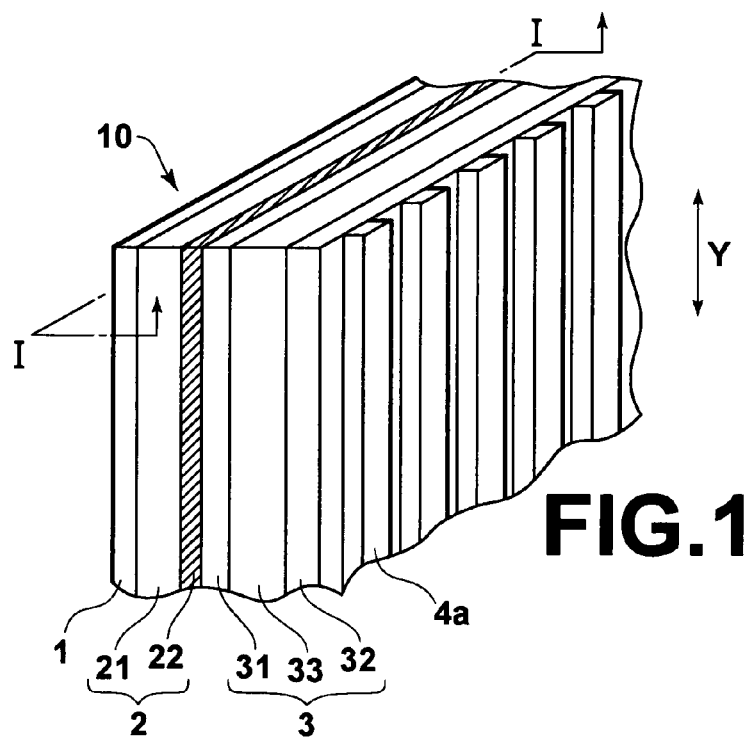
FIG. 1 is a perspective view showing a first embodiment of the image displaying device in accordance with the present invention.
Figure 2:
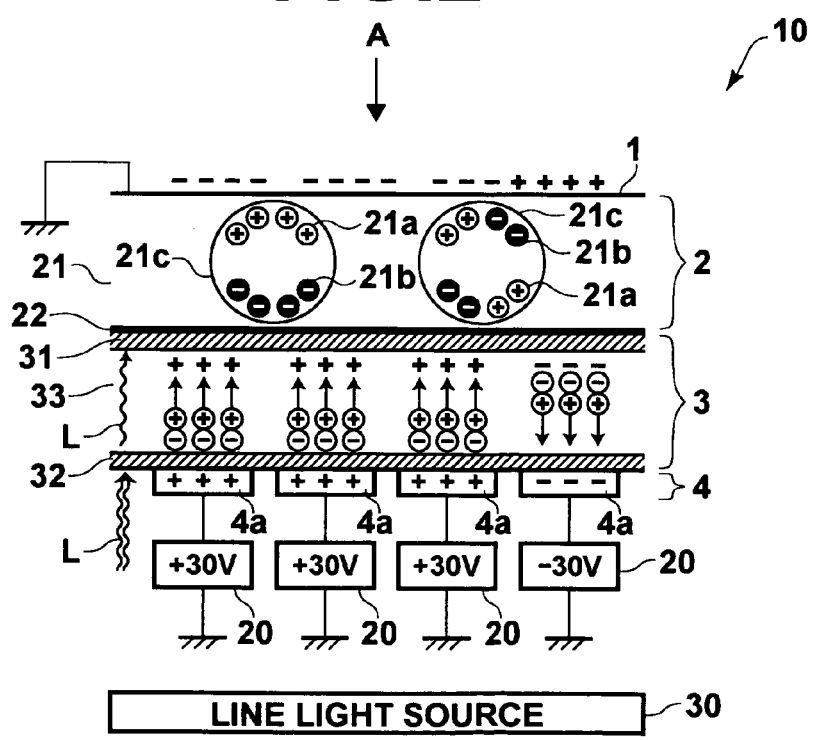
FIG. 2 is an explanatory sectional view taken on line I-I of FIG. 1, the view showing the first embodiment of the image displaying device in accordance with the present invention together with voltage applying sections and a line light source for constituting an example of an image displaying system.

An example of an image displaying system, in which an embodiment of the image displaying device in accordance with the present invention is employed, will be described hereinbelow. FIG. 1 is a perspective view showing a first embodiment of the image displaying device in accordance with the present invention, which is employed in the image displaying system. FIG. 2 is an explanatory sectional view taken on line I-I of FIG. 1, the view showing the first embodiment of the image displaying device in accordance with the present invention together with voltage applying sections and a line light source for constituting an example of an image displaying system.

As illustrated in FIG. 1 and FIG. 2, the image displaying system comprises an image displaying device 10. The image displaying device 10 comprises a first electrode layer 1, which is capable of transmitting visible light, and a displaying layer 2, whose optical characteristics alter in accordance with an electric field. The image displaying device 10 also comprises an optical switching layer 3, which is capable of exhibiting electrical conductivity when being exposed to reading light. The image displaying device 10 further comprises a second electrode layer 4, which is provided with a plurality of linear electrodes 4a, 4a, . . . arrayed in parallel with one another. The linear electrodes 4a, 4a, . . . are capable of transmitting line-like address light. The first electrode layer 1, the displaying layer 2, the optical switching layer 3, and the second electrode layer 4 are overlaid in this order. The image displaying system also comprises voltage applying sections 20, 20, . . . , each of which applies a predetermined voltage to one of the linear electrodes 4a, 4a, . . . of the image displaying device 10. The image displaying system further comprises a line light source 30 for irradiating the line-like address light to the image displaying device 10. The irradiation of the line-like address light is performed from the side of the second electrode layer 4 of the image displaying device 10. The line light source 30 is moved by a movement mechanism (not shown) in the length direction of each of the linear electrodes 4a, 4a, . . . , i.e. in the direction indicated by the arrow Y in FIG. 1.

The first electrode layer 1 is constituted of a material capable of transmitting visible light. For example, the first electrode layer 1 may be constituted of a tin dioxide film ($SnO_2$), an indium tin oxide (ITO) film, an Idemitsu Indium X-metal Oxide (IDIXO) film (an amorphous light-transmissive oxide film, supplied by Idemitsu Kosan K. K.), or the like, which has a thickness falling within the range of 50 nm to 200 nm.

The second electrode layer 4 is provided with the plurality of the linear electrodes 4a, 4a, . . . The linear electrodes 4a, 4a, . . . may be constituted of one of various materials, which are capable of transmitting the address light. For example, as in the cases of the first electrode layer 1, the linear electrodes 4a, 4a, . . . may be constituted of ITO, IDIXO, or the like.

The displaying layer 2 comprises a dispersion layer 21 and a light absorbing layer 22. The dispersion layer 21 contains a plurality of micro-capsules 21c, 21c, . . . dispersed therein. Each of the micro-capsules 21c, 21c, . . . contains positively charged white particles 21a, 21a, . . . and negatively charged black particles 21b, 21b, . . . The light absorbing layer 22 is constituted of a black sheet.

The optical switching layer 3 comprises a first electric charge generating layer 31 and a second electric charge generating layer 32, each of which is capable of generating electric charges when being exposed to the address light. The optical switching layer 3 also comprises a positive hole transporting layer 33, which is located between the first electric charge generating layer 31 and the second electric charge generating layer 32. Each of the first electric charge generating layer 31 and the second electric charge generating layer 32 may be constituted of one of various materials, which are capable of generating the electric charges when being exposed to the address light. Each of the first electric charge generating layer 31 and the second electric charge generating layer 32 should preferably be constituted of, for example, a photo-conductive material containing, as a principal constituent, at least one substance selected from the group consisting of a-Se, Se—Te, Se—As—Te, metal-free phthalocyanine, metallo-phthalocyanine, magnesium phthalocyanine (MgPc), phase II of vanadyl phthalocyanine (VoPc), and copper phthalocyanine (CuPc).

Also, the positive hole transporting layer 33 may be constituted of one of various materials, which have the characteristics such that the difference between the mobility of positive electric charges and the mobility of negative electric charges is large (e.g., at least $10^2$, and preferably at least $10^3$). The positive hole transporting layer 33 should preferably be constituted of, for example, an organic compound, such as a poly-N-vinylcarbazole (PVK), N,N'-diphenyl-N,N'-bis(3-methylphenyl)-[1, 1'-biphenyl]-4, 4'-diamine (TPD), or a disk-shaped liquid crystal; or a semiconductor substance, such as a polymer (polycarbonate, polystyrene, PVK) dispersion of TPD.

Each of the voltage applying sections 20, 20, . . . applies a voltage of +30V or −30V to one of the linear electrodes 4a, 4a, . . . in accordance with a given image signal.

The line light source 30 is moved by the movement mechanism (not shown) in the direction indicated by the arrow Y in FIG. 1. The image displaying device 10 is thus scanned with the line-like address light produced by the line light source 30. In this embodiment, as described above, the line-like address light is moved in the direction indicated by the arrow Y, and the entire area of the surface of the image displaying device 10 is thereby scanned with the address light. Alternatively, the scanning with spot-like light may be performed along the array direction of the linear electrodes 4a, 4a, . . . , along which direction the linear electrodes 4a, 4a, . . . stand side by side with one another, and along the direction indicated by the arrow Y, and the entire area of the surface of the image displaying device 10 may thus be scanned with the spot-like light.

How the image displaying system operates will be described hereinbelow.

Firstly, pixel signal components corresponding to one line, which are among the pixel signal components constituting an image signal representing an image to be displayed on the image displaying device 10, are fed into the voltage applying sections 20, 20, . . . In accordance with the received pixel signal components corresponding to one line, each of the voltage applying sections 20, 20, . . . applies the voltage to the corresponding one of the linear electrodes 4a, 4a, . . . In this embodiment, the voltage of −30V is applied to a linear electrode 4a corresponding to a pixel, which is to be seen as a black pixel in cases where the image displaying device 10 is seen from the direction indicated by the arrow A in FIG. 2. Also, the voltage of +30V is applied to a linear electrode 4a corresponding to a pixel, which is to be seen as a white pixel in cases where the image displaying device 10 is seen from the direction indicated by the arrow A in FIG. 2.

The application of the voltage to each of the linear electrodes 4a, 4a, . . . is performed in the manner described above, and the line light source 30 is actuated to irradiate address light L extending along the array direction of the linear electrodes 4a, 4a, . . . , along which direction the linear electrodes 4a, 4a, . . . stand side by side with one another. The irradiation of the address light L is performed from the side of the second electrode layer 4 of the image displaying device 10. The address light L, which has been irradiated from the side of the second electrode layer 4 of the image displaying device 10, impinges upon the second electric charge generating layer 32 of the optical switching layer 3. Also, part of the address light L, which has passed through the second electric charge generating layer 32 and the positive hole transporting layer 33, impinges upon the first electric charge generating layer 31.

When each of the first electric charge generating layer 31 and the second electric charge generating layer 32 is exposed to the address light L, pairs of positive and negative charges are generated in each of the first electric charge generating layer 31 and the second electric charge generating layer 32. Of the pairs of positive and negative charges having been generated in the first electric charge generating layer 31, the positive charges move within the positive hole transporting layer 33 and toward a negatively charged linear electrode 4a. The positive charges, which have thus moved within the positive hole transporting layer 33 and toward the negatively charged linear electrode 4a, combine with the negative charges of the negatively charged linear electrode 4a and disappear. Of the pairs of positive and negative charges having been generated in the first electric charge generating layer 31, the negative charges are accumulated in the vicinity of an area of the first electric charge generating layer 31.

Of the pairs of positive and negative charges having been generated in the second electric charge generating layer 32, the negative charges move toward the positive charges of a positively charged linear electrode 4a. The negative charges, which have thus moved toward the positive charges of the positively charged linear electrode 4a, combine with the positive charges of the positively charged linear electrode 4a and disappear. Of the pairs of positive and negative charges having been generated in the second electric charge generating layer 32, the positive charges move within the positive hole transporting layer 33 and toward the negative charges of the first electrode layer 1 and are accumulated in the vicinity of an area of the first electric charge generating layer 31.

As a result of the operation described above, the positive charges are accumulated in the vicinity of the area of the first electric charge generating layer 31, which area corresponds to the linear electrode 4a having been applied with the positive voltage. Also, the negative charges are accumulated in the vicinity of the area of the first electric charge generating layer 31, which area corresponds to the linear electrode 4a having been applied with the negative voltage.

Also, in accordance with the polarity of the electric charges having been accumulated in the vicinity of an area of the first electric charge generating layer 31, an electric field is formed between the area of the first electric charge generating layer 31 and the corresponding area of the first electrode layer 1. In accordance with the electric field having thus been formed, the white particles 21a, 21a, . . . and the black particles 21b, 21b, . . . , which are contained in each of the micro-capsules 21c, 21c, . . . having been dispersed in the dispersion layer 21 of the displaying layer 2, move within each of the micro-capsules 21c, 21c, . . . As a result of the movements of the white particles 21a, 21a, . . . and the black particles 21b, 21b, . . . within each of the micro-capsules 21c, 21c, . . . , the region of each of the micro-capsules 21c, 21c, . . . , which region is close to the side of the first electrode layer 1 and in which region the white particles 21a, 21a, . . . have been collected, is displayed as a white region when image displaying device 10 is seen from the direction indicated by the arrow A in FIG. 2. Also, the region of each of the micro-capsules 21c, 21c, . . . , which region is close to the side of the first electrode layer 1 and in which region the black particles 21b, 21b, . . . have been collected, is displayed as a black region when image displaying device 10 is seen from the direction indicated by the arrow A in FIG. 2.

After the displaying along the one line has been finished in the manner described above, the line light source 30 is moved in the direction indicated by the arrow Y in FIG. 1. Also, the pixel signal components corresponding to a next line, which are among the pixel signal components constituting the image signal representing the image to be displayed on the image displaying device 10, are fed into the voltage applying sections 20, 20, . . . Further, in the same manner as that described above, the displaying of the white region and the black region along the next one line is performed. The operation described above is iterated for all of the lines, and the image is ultimately displayed on the entire area of the surface of the image displaying device 10.

After the image has been displayed on the image displaying device 10 in the manner described above, the image is not caused to change when the voltage application with the voltage applying sections 20, 20, . . . is ceased. The displaying of the same image is kept until the voltage application and the irradiation of the line light are performed again.

With the aforesaid example of the image displaying system, with the application of the voltage to each of the linear electrodes 4a, 4a, . . . and the scanning with the address light, the electric field is formed between the first electrode layer 1 and the optical switching layer 3. The optical characteristics of the displaying layer 2 are caused by the electric field to alter, and the image information is thus displayed. Therefore, with the aforesaid example of the image displaying system, the advantages over the passive technique for applying the voltage by use of the simple matrix electrodes and thereby displaying the image information are capable of being obtained in that cross talk with respect to the length direction of each of the linear electrodes 4a, 4a, . . . is capable of being suppressed, and in that the image information of a large area and a high definition is capable of being displayed with good image quality. Also, with the aforesaid example of the image displaying system, the advantages over the active actuation technique utilizing the TFT's are capable of being obtained in that a high voltage is capable of being applied to each of the linear electrodes 4a, 4a, . . . , and therefore the response speed of the displaying layer 2 is capable of being kept high. Further, the cost is capable of being kept low.

Figure 3:
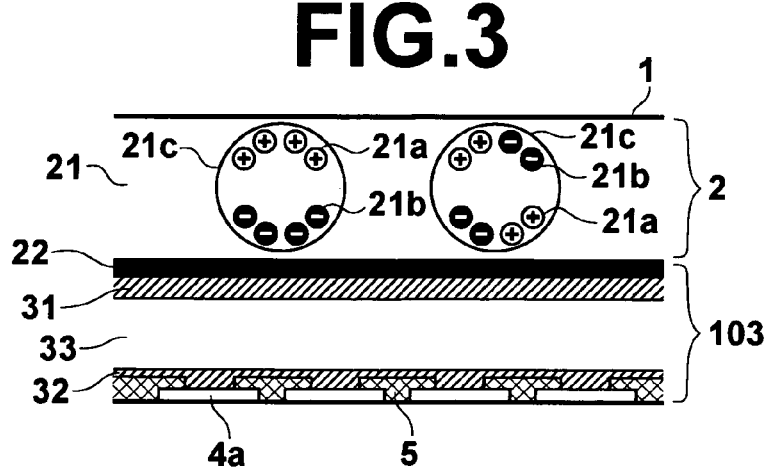
FIG. 3 is an explanatory sectional view showing a second embodiment of the image displaying device in accordance with the present invention.

FIG. 3 is an explanatory sectional view showing a second embodiment of the image displaying device in accordance with the present invention. In FIG. 3, similar elements are numbered with the same reference numerals with respect to FIG. 1. As illustrated in FIG. 3, the second embodiment of the image displaying device in accordance with the present invention comprises the first electrode layer 1, the displaying layer 2, and an optical switching layer 103 combined with the linear electrodes 4a, 4a, . . . constituting the second electrode layer 4. In the second embodiment of the image displaying device in accordance with the present invention, each of electrical insulators 5, 5, . . . is located between adjacent linear electrodes 4a, 4a and over ends of the adjacent linear electrodes 4a, 4a . The electrical insulators 5, 5, . . . should preferably be constituted of a material having the characteristics of blocking the address light, such as an acrylic resin containing carbon black. In cases where each of the electrical insulators 5, 5, . . . is located between the adjacent linear electrodes 4a, 4a, cross talk between the linear electrodes 4a, 4a is capable of being suppressed. Also, in cases where the electrical insulators 5, 5, . . . are constituted of the material having the characteristics of blocking the address light, discharging of the optical switching layer 103 due to the irradiation of the address light to the areas among the linear electrodes 4a, 4a, . . . is capable of being suppressed. Therefore, cross talk among the linear electrodes 4a, 4a, . . . is capable of being suppressed even further.

Figure 4:
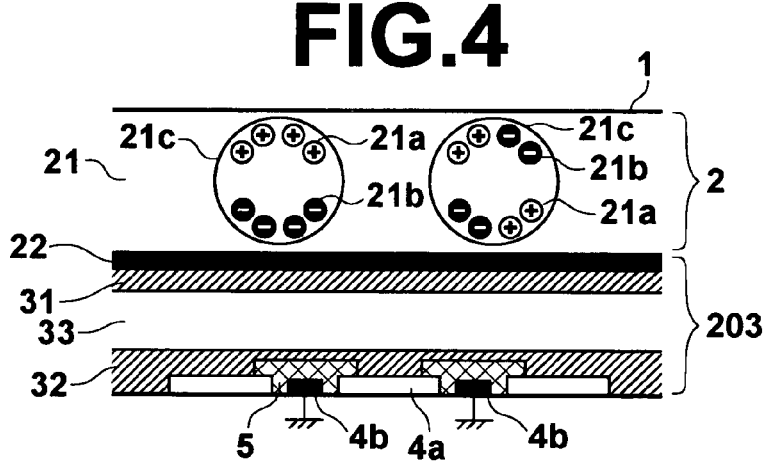
FIG. 4 is an explanatory sectional view showing a third embodiment of the image displaying device in accordance with the present invention.

FIG. 4 is an explanatory sectional view showing a third embodiment of the image displaying device in accordance with the present invention. In FIG. 4, similar elements are numbered with the same reference numerals with respect to FIG. 1. As illustrated in FIG. 4, the third embodiment of the image displaying device in accordance with the present invention comprises the first electrode layer 1, the displaying layer 2, and an optical switching layer 203 combined with the linear electrodes 4a, 4a, . . . constituting the second electrode layer 4. In the third embodiment of the image displaying device in accordance with the present invention, besides the provision of each of the electrical insulators 5, 5, . . . between the adjacent linear electrodes 4a, 4a, each of linear electromagnetic wave non-transmissive electrodes 4b, 4b, . . . which have the characteristics of blocking the line light, is located between the adjacent linear electrodes 4a, 4a and is grounded. The electromagnetic wave non-transmissive electrodes 4b, 4b, . . . are located in parallel. Alternatively, instead of each of the electrical insulators 5, 5, . . . being located between the adjacent linear electrodes 4a, 4a, only each of the linear electromagnetic wave non-transmissive electrodes 4b, 4b, . . . may be located between the adjacent linear electrodes 4a, 4a . In such cases, the discharging of the optical switching layer 203 due to the irradiation of the address light to the areas among the linear electrodes 4a, 4a, . . . is capable of being suppressed. Also, since the areas among the linear electrodes 4a, 4a, . . . are capable of being grounded with the electromagnetic wave non-transmissive electrodes 4b, 4b, . . . , cross talk among the linear electrodes 4a, 4a, . . . is capable of being suppressed even further.

Figure 5:
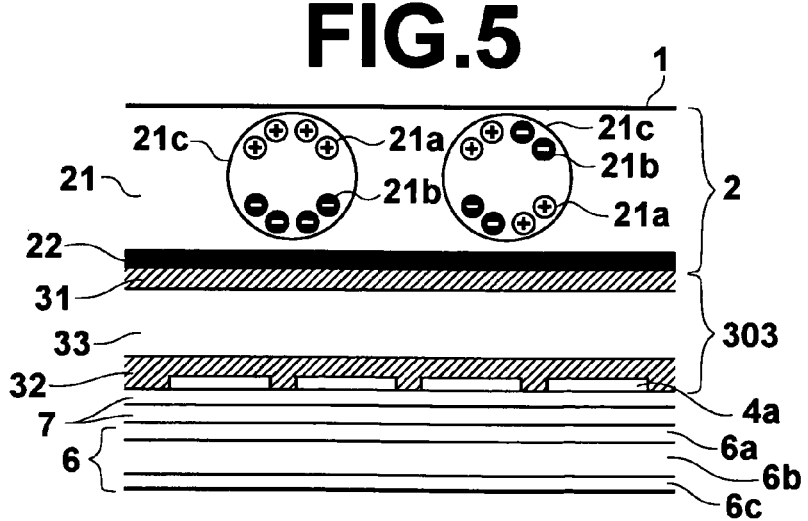
FIG. 5 is an explanatory sectional view showing a different example of an image displaying system, in which a fourth embodiment of the image displaying device in accordance with the present invention is employed.

In each of the aforesaid examples of the image displaying systems, in which the first, second, or third embodiment of the image displaying device in accordance with the present invention is employed, the line light source 30 is utilized. Alternatively, in lieu of the line light source 30, an organic electroluminescent (EL) light source having a planar shape may be utilized. FIG. 5 is an explanatory sectional view showing a different example of an image displaying system, in which a fourth embodiment of the image displaying device in accordance with the present invention is employed. In FIG. 5, similar elements are numbered with the same reference numerals with respect to FIG. 1. As illustrated in FIG. 5, the fourth embodiment of the image displaying device in accordance with the present invention comprises the first electrode layer 1, the displaying layer 2, and an optical switching layer 303 combined with the linear electrodes 4a, 4a, . . . constituting the second electrode layer 4. Specifically, as illustrated in FIG. 5, an organic EL light source 6 may be laminated with the image displaying device in accordance with the present invention. As illustrated in FIG. 5, a support material 7 constituted of a transparent film is overlaid on the surface of the image displaying device, which surface is located on the side of the second electrode layer 4. Also, a support material 7 constituted of a transparent film is overlaid on the surface of the organic EL light source 6. The support material 7 overlaid on the surface of the image displaying device and the support material 7 overlaid on the surface of the organic EL light source 6 are adhered to each other, and the image displaying device and the organic EL light source 6 are thereby laminated together.

The organic EL light source 6 comprises an organic EL layer 6b for producing light in accordance with voltage application. The organic EL light source 6 also comprises an anodic electrode layer 6a provided with a plurality of transparent linear electrodes arrayed such that the transparent linear electrodes stand side by side in the length direction of each of the linear electrodes 4a, 4a, . . . of the image displaying device. The transparent linear electrodes constituting the anodic electrode layer 6a are capable of transmitting the light produced by the organic EL layer 6b in accordance with the voltage application. The organic EL light source 6 further comprises a cathodic electrode layer 6c, which is constituted of a planar electrode. The voltage is applied successively to each of the transparent linear electrodes of the anodic electrode layer 6a, and the light is produced by the organic EL layer 6b in accordance with the voltage application. The line-like light produced as the address light by the organic EL layer 6b in accordance with the voltage application passes through the transparent linear electrodes of the anodic electrode layer 6a and impinges upon the image displaying device.

Figure 6:
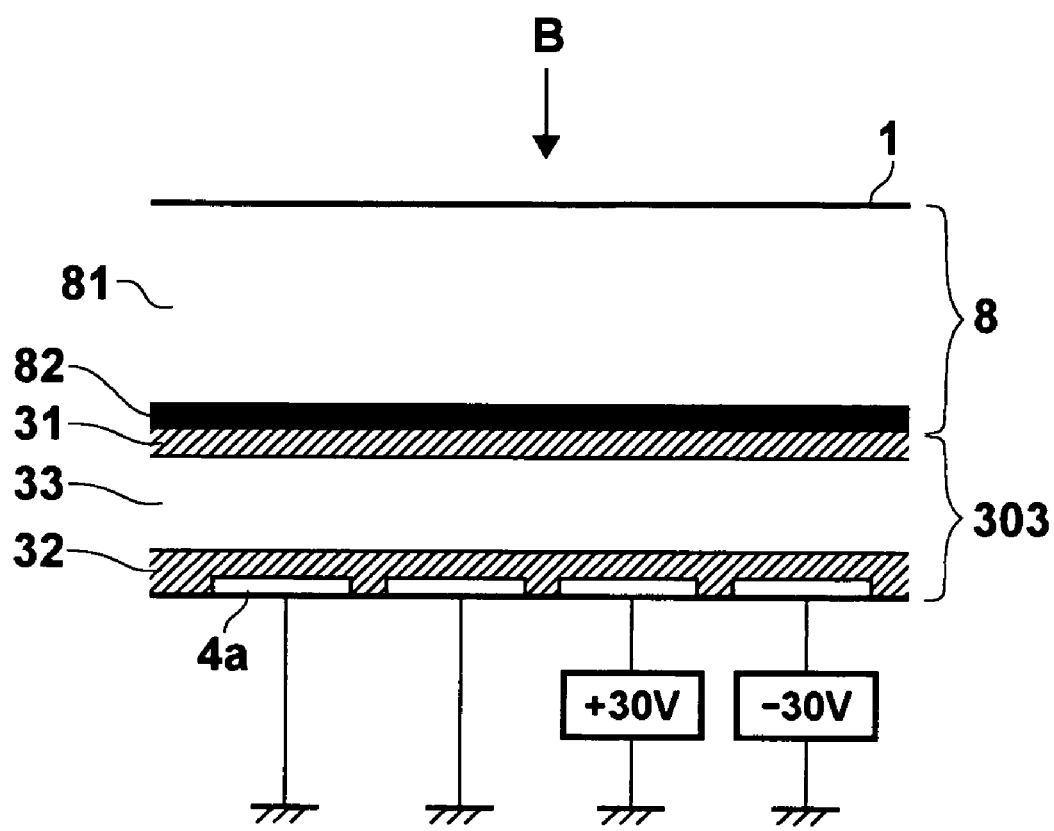
FIG. 6 is an explanatory sectional view showing a different example of an image displaying system, in which a fifth embodiment of the image displaying device in accordance with the present invention is employed.

In the aforesaid embodiments of the image displaying device in accordance with the present invention, the displaying layer 2 is constituted of the dispersion layer 21 and the light absorbing layer 22. Alternatively, as illustrated in FIG. 6, as the displaying layer of the image displaying device, a displaying layer 8 constituted of a liquid crystal layer 81, which is composed of a liquid crystal, and a light absorbing layer 82 may be employed. FIG. 6 is an explanatory sectional view showing a different example of an image displaying system, in which a fifth embodiment of the image displaying device in accordance with the present invention is employed. In FIG. 6, similar elements are numbered with the same reference numerals with respect to FIG. 5.

With the fifth embodiment of the image displaying device in accordance with the present invention, in which the displaying layer 8 provided with the liquid crystal layer 81 is employed, in cases where a positive voltage is applied to a linear electrode 4a, the orientations of major axes of the liquid crystal molecules, which are located at the region corresponding to the linear electrode 4a, coincide with the direction indicated by the arrow B in FIG. 6. As a result, when the image displaying device is seen from the direction indicated by the arrow B in FIG. 6, the region corresponding to the linear electrode 4a is displayed as a black region. Also, in cases where the voltage is not applied to the linear electrode 4a, the orientations of the major axes of the liquid crystal molecules, which are located at the region corresponding to the linear electrode 4a, become irregular, and light scattering occurs in the region corresponding to the linear electrode 4a. As a result, when the image displaying device is seen from the direction indicated by the arrow B in FIG. 6, the region corresponding to the linear electrode 4a is displayed as a white region.

As the liquid crystal constituting the liquid crystal layer 81 of the displaying layer 8, a polymer network liquid crystal (PNLCD) should preferably be utilized. Alternatively, as the liquid crystal constituting the liquid crystal layer 81 of the displaying layer 8, a cholesteric liquid crystal may be utilized. In cases where the cholesteric liquid crystal is utilized as the liquid crystal constituting the liquid crystal layer 81, an a.c. voltage having a pulsed wave form should preferably be employed as the voltage applied to the linear electrode 4a. Also, in cases where the cholesteric liquid crystal is utilized as the liquid crystal constituting the liquid crystal layer 81, the voltage may be applied to all of the linear electrodes 4a, 4a, . . . , and the pattern light may be irradiated from the side of the second electrode layer 4 of the image displaying device. In this manner, an image corresponding to the pattern light is capable of being displayed.

The layer constitution of the image displaying device employed in the image displaying system is not limited to the layer constitutions employed in the embodiments described above. For example, a different layer may be added to the layer constitutions employed in the embodiments described above.

An embodiment of the image displaying control apparatus in accordance with the present invention will be described hereinbelow. The constitution of the embodiment of the image displaying control apparatus in accordance with the present invention is basically identical with part of the constitution of the image displaying system illustrated in FIG. 2, in which the image displaying device 10 of FIG. 1 is employed.

The embodiment of the image displaying control apparatus in accordance with the present invention comprises the optical switching layer 3 and the second electrode layer 4 of the image displaying device 10 illustrated in FIG. 2. The embodiment of the image displaying control apparatus in accordance with the present invention also comprises the voltage applying sections 20, 20, . . . and the line light source 30 illustrated in FIG. 2. An image displaying medium, which comprises the first electrode layer 1 and the displaying layer 2 provided with the light absorbing layer 22 of the image displaying device 10, is capable of being located in association with the image displaying control apparatus in the same manner as that illustrated in FIG. 2. In the embodiment of the image displaying control apparatus in accordance with the present invention, a light absorbing layer different from the light absorbing layer 22 of the image displaying medium is located on the side of the optical switching layer 3 of the image displaying control apparatus, which side stands facing the image displaying medium. The image displaying control apparatus is capable of being releasably combined with the image displaying medium, such that the light absorbing layer of the image displaying control apparatus and the light absorbing layer 22 of the image displaying medium may stand facing each other.

In the image displaying control apparatus in accordance with the present invention, as in the cases of the aforesaid embodiments of the image displaying device in accordance with the present invention, each of the electrical insulators 5, 5, . . . maybe located between the adjacent linear electrodes 4a, 4a and over the ends of the adjacent linear electrodes 4a, 4a . Also, each of the linear electromagnetic wave non-transmissive electrodes 4b, 4b, . . . , which have the characteristics of blocking the line light, may be located between the adjacent linear electrodes 4a, 4a, the electromagnetic wave non-transmissive electrodes 4b, 4b, . . . being located in parallel.

Also, in the image displaying control apparatus in accordance with the present invention, as in the cases of the aforesaid embodiment of the image displaying device in accordance with the present invention, in lieu of the line light source 30 being utilized as in the cases of the image displaying device 10, the organic EL light source having the planar shape may be utilized.

Further, as in the cases of the aforesaid embodiment of the image displaying device in accordance with the present invention, in lieu of the displaying layer 2, the image displaying medium may be provided with the displaying layer 8, which comprises the liquid crystal layer 81 and the light absorbing layer 82.

The layer constitution of the image displaying control apparatus containing the optical switching layer is not limited to the layer constitution employed in the embodiment described above. For example, a different layer may be added to the layer constitution employed in the embodiment described above.

What is claimed is:

1. An image displaying method, comprising the steps of:
    i) overlaying;
        a) a first electrode layer, which is capable of transmitting visible light,
        b) a displaying layer, whose optical characteristics alter in accordance with an electric field,
        c) an optical switching layer, which is capable of exhibiting electrical conductivity when being exposed to an electromagnetic wave, and
        d) a second electrode layer, which is provided with a plurality of linear electrodes arrayed in parallel with one another, the linear electrodes being capable of transmitting the electromagnetic wave,
    in this order,
    ii) applying a voltage to each of the linear electrodes and in accordance with image information, and
    iii) performing scanning with the electromagnetic wave in two-dimensional directions and from the side of the second electrode layer, an electric field being formed between the first electrode layer and the optical switching layer by electric charges, which are caused to occur in the optical switching layer by the scanning with the electromagnetic wave, the optical characteristics of the displaying layer altering in accordance with the electric field, whereby the image information is displayed.

2. An image displaying method as defined in claim 1, further comprising electrical insulators wherein at least one of the electrical insulators is located between adjacent linear electrodes.

3. An image displaying method as defined in claim 2 wherein the electrical insulators have characteristics of blocking the electromagnetic wave.

4. The image displaying method according to claim 2, wherein linear electrodes are disposed within the second electrode layer and an electrical insulator is disposed between each adjacent pair of linear electrodes.

5. The image display device according to claim 4, wherein the electrical insulator disposed between each adjacent pair of linear electrodes covers an edge portion of each of the adjacent pair of linear electrodes on a portion facing the first electrode layer.

6. An image displaying method as defined in claim 1 further comprising linear electromagnetic wave non-transmissive electrodes, which have characteristics of blocking the electromagnetic wave, wherein at least one of the linear electromagnetic wave non-transmissive electrodes is located between adjacent linear electrodes, the linear electromagnetic wave non-transmissive electrodes being located in parallel.

7. An image displaying method as defined in claim 1 wherein the displaying layer contains a plurality of micro-capsules dispersed therein, each of the micro-capsules containing two kinds of particles having different color tones and different polarities.

8. An image displaying method as defined in claim 1 wherein the displaying layer is constituted of a liquid crystal.

9. The image display method according to claim 8, wherein the liquid crystal is twisted nematic liquid crystal.

10. The image display method according to claim 1, wherein the scanning with the electromagnetic waves is performed by an organic electroluminescent light source having a planar shape disposed to face the second electrode layer.

11. The image display method according to claim 1, wherein the electromagnetic wave is visible reading light.

12. The image display method according to claim 1, wherein the optical switch layer includes a photoconductor.

13. An image displaying device, comprising:
    i) a first electrode layer, which is capable of transmitting visible light,
    ii) a displaying layer, whose optical characteristics alter in accordance with an electric field,
    iii) an optical switching layer, which is capable of exhibiting electrical conductivity when being exposed to an electromagnetic wave, and
    iv) a second electrode layer, which is provided with a plurality of linear electrodes arrayed in parallel with one another, the linear electrodes being capable of transmitting the electromagnetic wave,
    the first electrode layer, the displaying layer, the optical switching layer, and the second electrode layer being overlaid in this order,
    wherein the image displaying device is operated such that:
    a voltage in accordance with image information is applied to each of the linear electrodes, and
    scanning with the electromagnetic wave is performed in two-dimensional directions and from the side of the second electrode layer, an electric field being formed between the first electrode layer and the optical switching layer by electric charges, which are caused to occur in the optical switching layer by the scanning with the electromagnetic wave, the optical characteristics of the displaying layer altering in accordance with the electric field, whereby the image information is displayed.

14. An image displaying device as defined in claim 13, further comprising electrical insulators wherein at least one of the electrical insulators is located between adjacent linear electrodes.

15. An image displaying device as defined in claim 6 wherein the electrical insulators have characteristics of blocking the electromagnetic wave.

16. An image displaying device as defined in claim 13, further comprising linear electromagnetic wave non-transmissive electrodes, which have characteristics of blocking the electromagnetic wave, wherein at least one of the linear electromagnetic wave non-transmissive electrodes is located between adjacent linear electrodes, the linear electromagnetic wave non-transmissive electrodes being located in parallel.

17. An image displaying device as defined in claim 13 wherein the displaying layer contains a plurality of micro-capsules dispersed therein, each of the micro-capsules containing two kinds of particles having different color tones and different polarities.

18. An image displaying device as defined in claim 13 wherein the displaying layer is constituted of a liquid crystal.

19. The image display device according to claim 13, wherein linear electrodes are disposed within the second electrode layer and an electrical insulator is disposed between each adjacent pair of linear electrodes.

20. The image display device according to claim 19, wherein the electrical insulator disposed between each adjacent pair of linear electrodes covers an edge portion of each of the adjacent pair of linear electrodes on a portion facing the first electrode layer.

21. The image display method according to claim 13, wherein the scanning with the electromagnetic waves is performed by an organic electroluminescent light source having a planar shape disposed to face the second electrode layer.

22. An image displaying control method, wherein an image displaying operation is controlled such that an electric field in accordance with image information is formed across an image displaying medium, whose optical characteristics alter in accordance with an electric field, and the image information is thus displayed, the method comprising the steps of:
   i) locating optical switching means, which is capable of exhibiting electrical conductivity when being exposed to an electromagnetic wave, and which acts to form the electric field across the image displaying medium,
   ii) arraying a plurality of linear electrodes in parallel with one another and in association with the optical switching means, the linear electrodes being capable of transmitting the electromagnetic wave,
   iii) applying a voltage in accordance with the image information from each of the linear electrodes to the optical switching means, and
   iv) irradiating the electromagnetic wave to the optical switching means.

23. An image displaying control method as defined in claim 22 wherein the image displaying medium comprises a displaying layer, which contains a plurality of micro-capsules dispersed therein, each of the micro-capsules containing two kinds of particles having different color tones and different polarities.

24. An image displaying control method as defined in claim 22 wherein the image displaying medium comprises a displaying layer, which is constituted of a liquid crystal.

25. An image displaying control apparatus, wherein an image displaying operation is controlled such that an electric field in accordance with image information is formed across an image displaying medium, whose optical characteristics alter in accordance with an electric field, and the image information is thus displayed, the apparatus comprising:
   i) optical switching means, which is capable of exhibiting electrical conductivity when being exposed to an electromagnetic wave, and which acts to form the electric field across the image displaying medium,
   ii) electromagnetic wave irradiating means for irradiating the electromagnetic wave to the optical switching means, and
   iii) voltage applying means, which is provided with a plurality of linear electrodes arrayed in parallel with one another, the liner electrodes being capable of transmitting the electromagnetic wave, the voltage applying means operating such that a voltage in accordance with the image information is applied from each of the linear electrodes to the optical switching means.

26. An image displaying control apparatus as defined in claim 25 wherein the image displaying medium comprises a displaying layer, which contains a plurality of micro-capsules dispersed therein, each of the micro-capsules containing two kinds of particles having different color tones and different polarities.

27. An image displaying control apparatus as defined in claim 25 wherein the image displaying medium comprises a displaying layer, which is constituted of a liquid crystal.

* * * * *